United States Patent
West et al.

(10) Patent No.: US 7,755,310 B2
(45) Date of Patent: Jul. 13, 2010

(54) METHOD AND APPARATUS FOR ELECTRIC MOTOR TORQUE MONITORING

(75) Inventors: Stephen T. West, New Palestine, IN (US); Wei D. Wang, Troy, MI (US); Sean E Gleason, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 338 days.

(21) Appl. No.: 11/853,113

(22) Filed: Sep. 11, 2007

(65) Prior Publication Data

US 2009/0066281 A1    Mar. 12, 2009

(51) Int. Cl.
*H02P 21/00* (2006.01)

(52) U.S. Cl. .............. 318/400.02; 318/432; 318/400.09

(58) Field of Classification Search ............ 318/400.06, 318/400.09, 400.02, 400.21, 432, 434
See application file for complete search history.

(56) References Cited

U.S. PATENT DOCUMENTS

| | | | |
|---|---|---|---|
| 6,163,128 A * | 12/2000 | Hiti et al. | 318/722 |
| 6,495,980 B2 * | 12/2002 | Cho et al. | 318/400.02 |
| 6,605,912 B1 * | 8/2003 | Bharadwaj et al. | 318/400.09 |
| 6,864,662 B2 * | 3/2005 | Recker | 318/807 |
| 7,049,779 B2 * | 5/2006 | Chen et al. | 318/400.09 |
| 2002/0105335 A1 * | 8/2002 | Mir et al. | 324/503 |

* cited by examiner

*Primary Examiner*—Rina I Duda
(74) *Attorney, Agent, or Firm*—Ingrassia Fisher & Lorenz, P.C.

(57) ABSTRACT

Methods and apparatus are provided for monitoring an achieved motor torque produced by an electric motor. The method includes determining the achieved motor torque based on a rotor position of the electric motor and a phase current of the electric motor when the motor speed is not greater than a first pre-determined threshold, determining the achieved motor torque based on a loss-compensated power supplied to the electric motor when the motor speed is greater than the first pre-determined threshold, comparing the achieved motor torque with the torque command, and indicating a fault when the achieved motor torque is not within a pre-determined margin of the torque command.

17 Claims, 3 Drawing Sheets

METHOD AND APPARATUS FOR ELECTRIC MOTOR TORQUE MONITORING

TECHNICAL FIELD

The present invention generally relates to electric motors, and more particularly relates to methods and apparatus for monitoring electric motor torque.

BACKGROUND OF THE INVENTION

Electric motors (e.g., permanent magnet synchronous motors) are used in a variety of applications, including vehicle applications. In hybrid vehicle development, the electric motor is a fundamental component of the hybrid powertrain system. Among other functions, the electric motor is a torque source. For example, the motor may be operated to produce a positive torque for propelling the vehicle in a motoring mode. The motor may also be operated to produce a negative torque for energy generation in a generating mode.

The actual torque output of the electric motor may not necessarily correspond with a desired or commanded torque, and thus affect the torque integrity. For example, the electric motor may produce a torque output having a polarity that is opposite of the commanded torque. The commanded torque value may be compared with the actual torque output of the electric motor to determine whether a threshold is exceeded for control. However, a number of variables (e.g., measured motor speed, conditions contributing to losses, sensed rotor position, or the like) may affect the determination of the actual torque output.

Accordingly, it is desirable to provide a method and system for monitoring electric motor torque. Additionally, it is desirable to provide a method and system for detecting motor torque integrity of hybrid vehicles. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and apparatus are provided for monitoring a motor torque produced by an electric motor. In one embodiment, a method is provided for monitoring an achieved motor torque produced by an electric motor in response to a torque command. The electric motor is operable at a motor speed. The method comprises determining the achieved motor torque based on a rotor position of the electric motor and a phase current of the electric motor when the motor speed is not greater than a first pre-determined threshold, determining the achieved motor torque based on a loss-compensated power supplied to the electric motor when the motor speed is greater than the first pre-determined threshold, comparing the achieved motor torque with the torque command, and indicating a fault when the achieved motor torque is not within a pre-determined margin of the torque command.

In another embodiment, a controller is provided for monitoring an achieved motor torque produced by an electric motor in response to a torque command. The controller comprises an input, an output, and a processor coupled to the input and the output. The input is operable to receive the motor speed of the electric motor, the torque command, a rotor position of the electric motor, and a phase current of the electric motor. The output is configured to provide a signal indicating a fault. The processor is configured to determine the achieved motor torque based on the rotor position of the electric motor and the phase current of the electric motor when the motor speed is not greater than a first pre-determined threshold, determine the achieved motor torque based on a loss-compensated power supplied to the electric motor when the motor speed is greater than the first pre-determined threshold, and produce the signal when the achieved motor torque is not within a pre-determined margin of the torque command.

In another embodiment, a software program is provided comprising software instructions arranged to run on a processor to monitor an achieved motor torque produced by an electric motor. The software program, when installed and operating on the processor, results in the processor determining the achieved motor torque based on a rotor position of the electric motor and a phase current of the electric motor when the motor speed is not greater than a first pre-determined threshold, determining the achieved motor torque based on a loss-compensated power supplied to the electric motor when the motor speed is greater than the first pre-determined threshold, comparing the achieved motor torque with the torque command, and indicating a fault is the achieved motor torque is not within a pre-determined margin of the torque command.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

A method, controller, and software program are provided for monitoring a torque output of an electric motor, such as a permanent magnet (PM) machine. In general, the torque produced by the electric motor is monitored to determine motor torque integrity, secure the delivery of torque from the electric motor, and provide a warning or transmit fault information if the motor torque integrity is not within desired operating criteria. The term "secure" is used herein to generally refer to an indication of reliability of variables used to determine the motor torque and of the motor torque itself. Appropriate remedial actions may be taken in response to the warning or upon receipt of the fault information.

In one embodiment, a motor torque monitor (MTM) is provided to monitor the torque produced by the electric motor, for example, as part of an overall hybrid vehicle torque security. The MTM may be integrated into multi-layer or multi-level control architectures for vehicle systems. For example, the MTM may be integrated with layer one diagnostics (e.g., a basic diagnostic layer) and assume the functionality of the layer one diagnostics including, but not necessarily limited to, electrical and performance diagnostics for resolvers, current sensors, voltage measurements, temperature measurements, or the like, of a vehicle system. Additionally, the MTM may assume the functionality of forward path torque control functions associated with the control architecture including, but not necessarily limited to, current feedback control, pulse width modulation (PWM), temperature compensation, torque limiting, torque protection, or the like.

Figure 1:
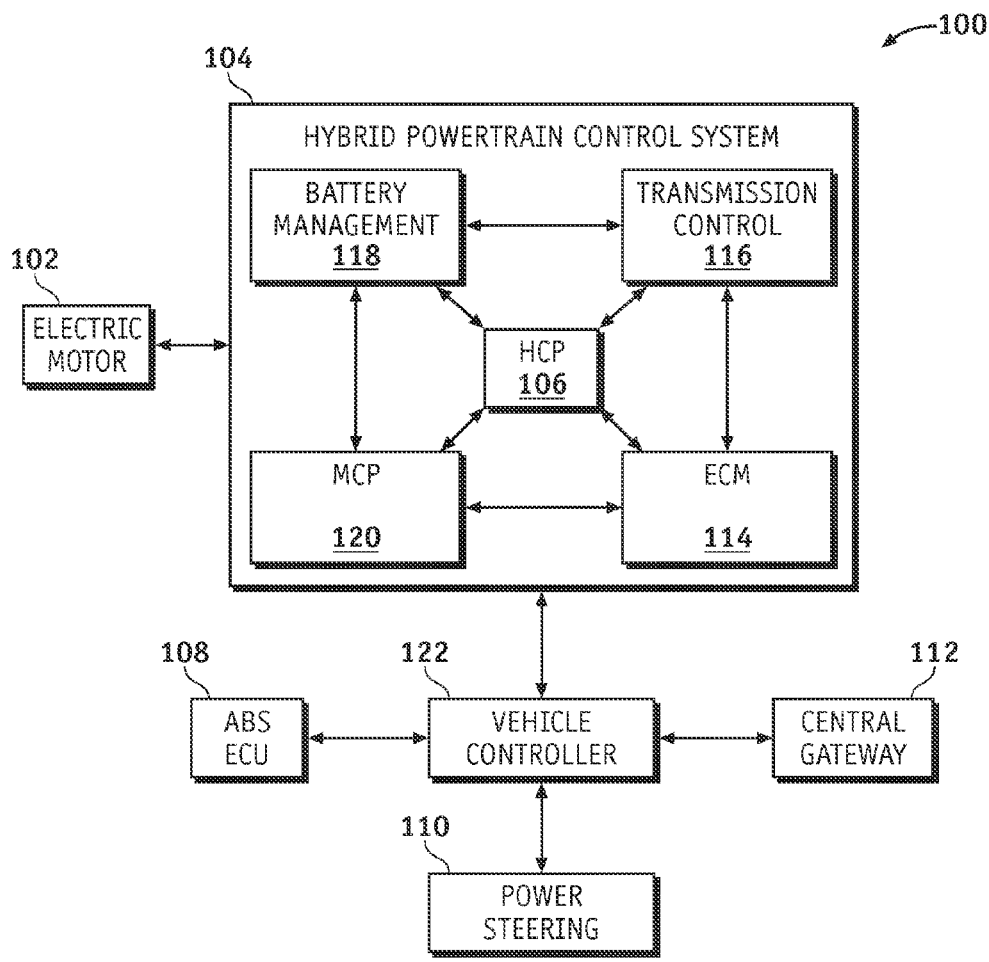
FIG. 1 is a block diagram of a hybrid vehicle control system in accordance with an exemplary embodiment.

Referring to FIG. 1, a vehicle control system 100 is shown in accordance with an exemplary embodiment. The system 100 comprises an electric motor 102, a hybrid powertrain control system 104 coupled to the electric motor 102, and a vehicle controller 122 in communication with the hybrid powertrain control system 104 (e.g., via a serial peripheral interface (SPI)). The vehicle controller 122 interfaces with one or more control systems, such as an anti-lock brake system (ABS) electronic control unit (ECU) 108, a power steering system 110, or the like, and may interface with a central gateway 112 that provides communication with other vehicle control systems. One or more additional electric motors may be coupled to, and thereby controlled by, the hybrid powertrain control system 104. Although the system 100 is described in the context of a hybrid vehicle powertrain (e.g., a gas-electric hybrid vehicle powertrain), the system 100 may be implemented for other systems incorporating one or more electric motors.

In this embodiment, the hybrid powertrain control system 104 comprises an engine control module (ECM) 114, a transmission control module 116, a battery management module 118, a motor control processor (MCP) 120, and a hybrid control processor (HCP) 106, although the hybrid powertrain control system 104 may include additional ECUs, processors, modules, or the like. For example, in one advanced hybrid vehicle implementation, two electric motors are typically used with an internal combustion engine or with fuel cells, and each of the electric motors is controlled with a separate MCP. Additionally, the hybrid powertrain control system 104 may be partitioned in a variety of other configurations.

Among other functions, the hybrid powertrain control system 104 controls the operation of the electric motor 102 through the MCP 120. For example, the MCP 120 performs forward path torque control functions including, but not necessarily limited to, current feedback control, pulse width modulation (PWM), temperature compensation, torque limiting, torque protection, or the like. The HCP 106 establishes a pre-determined hybrid operating strategy and coordinates a variety of operations of the hybrid vehicle in furtherance thereof. For example, the HCP 106 determines a preferred motor torque for a given driver command and for a particular vehicle condition based on the pre-determined hybrid operating strategy.

Figure 2:
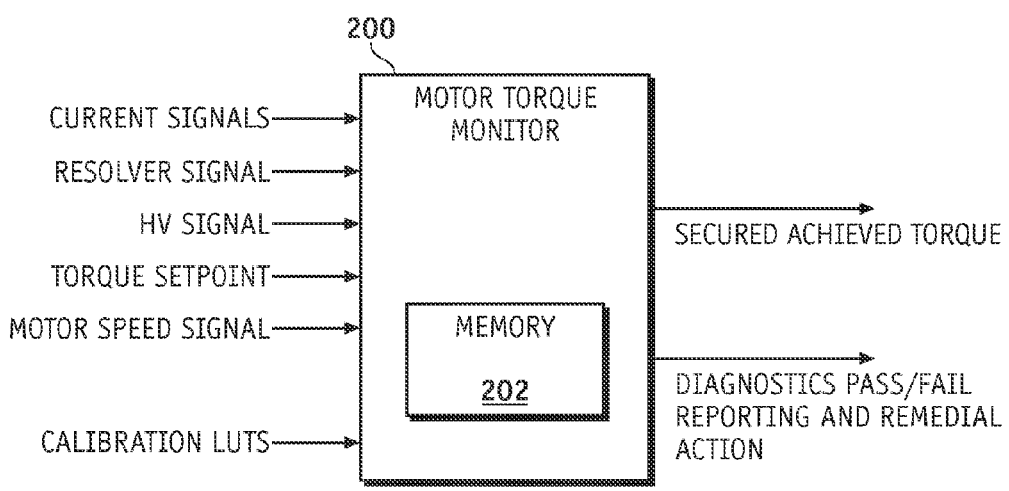
FIG. 2 is a block diagram of a motor torque monitor in accordance with an exemplary embodiment.

FIG. 2 is a block diagram of a motor torque monitor (MTM) 200 in accordance with an exemplary embodiment. Referring to FIGS. 1 and 2, the MTM 200 is incorporated into the MCP 120 in one embodiment. Executable instruction sets within the MTM 200, such as stored in a memory 202 of the MTM 200, comprise software code for monitoring operations of the electric motor 102. One or more of the components of the MTM 200 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components, or a combination thereof.

A primary function of the MTM 200 is to monitor an achieved torque produced by the electric motor 102, report the diagnostic result, and trigger remedial action if a fault is detected. The term "achieved torque" is referred to herein as a calculated torque output of the electric motor 102 based at least in part on a secured rotor position of the electric motor 102 and secured phase current signals or based in part on the estimated motor torque (e.g., based on an ideal power considering some or all losses). In the process of securing the achieved torque of the electric motor 102, the MTM 200 acquires one or more sensed current signals, a resolver signal, a $V_{dc}$ signal, a torque command (e.g., a torque setpoint signal or a requested torque), a motor speed signal, and information from one or more calibration look-up tables (LUTs) (e.g., from other data storage devices accessible by the MCP 120 within the hybrid powertrain control system 104 or via the HCP 106 or within the memory 202 of the MTM 200). By securing the achieved torque and the torque capabilities of the electric motor 102, the MTM 200 operates as a higher level control (e.g., a layer two control of a multi-layer or multi-level control architecture) to capture or indicate faults that may not have been captured by a lower level (e.g., the layer one diagnostics). In the event a particular signal is determined to be unsecure by the MTM 200, a remedial action may be taken. For example, the HCP 106 may initiate any number of different programs, executable instructions sets, or the like.

In one embodiment, layer one diagnostics of a multi-layer control architecture are applied to at least some of these signals prior to being received by the MTM 200. Generally, the information contained in these signals are transferred to the memory 202 of the MTM 200, and the information contained in each of these signals is secured, directly or indirectly, by the MTM 200 prior to determining the achieved torque of the electric motor 102 and securing this achieved torque. A maximum loop time (e.g., about 10 ms) may be selected to ensure the receipt of the various signals by the MTM 200 and secure the achieved torque and torque capabilities.

Layer one diagnostics are applied to the one or more sensed current signals, which represent a current supplied to the electric motor 102. For example, a voltage source inverter (not shown) may be used to supply current to the electric motor 102. For a three-phase electric motor, the voltage source inverter supplies a current for each phase of the three-phase electric motor (e.g., a first phase current ($i_a$), a second phase current ($i_b$), and a third phase current ($i_c$)), and three sensed current signals are derived from the three currents corresponding to each phase of the three-phase electric motor. For example, the voltage source inverter produces three-phase voltages (e.g., $V_a$, $V_b$, $V_c$) from a supply potential (e.g., a battery or DC bus voltage ($2V_{dc}$)) and drives the electric motor 102 with the three-phase voltages. The voltage source inverter converts the supply voltage ($2V_{dc}$) into an AC voltage which is used to drive the electric motor 102, and the AC voltage is based on three phase currents (e.g., $i_a$, $i_b$, and $i_c$). Applying layer one diagnostics to the current sensor signals may determine, whether current sensor wires are faulty, whether a current-sensing circuit has a short to a power supply (e.g., a battery), or the like.

Following layer one diagnostics of the three-phase sensed current signals, the MTM 200 secures the sensed current signals. For example, the MTM 200 compares a sum of the phase currents (e.g., $i_a$, $i_b$, and $i_c$) associated with each of the sensed current signals with a current threshold. The current threshold may be calibrated to judge a balance quality of the phase currents ($i_a$, $i_b$, and $i_c$). If this sum exceeds the current threshold, the MTM 200 transmits a signal indicating a fault alarm. If this sum is within the current threshold, the sensed current signals are secured.

In addition to the sensed current signals, layer one diagnostics may be applied to the resolver signal, which indicates a rotor position (θ) of the electric motor 102. The layer one diagnostics applied to the resolver signal may determine a short of the electric motor 102 to a ground or to a power supply (e.g., a battery); verify a resolver offset, or the like. A resolver decoding chip (not shown) in the MCP 120 may also provide intensive diagnostics to ensure the correctness of the rotor angle produced by the resolver. Based on the rotor position (θ), sine and cosine values of the rotor position (θ) may be calculated by the MCP 120 or other processor or retrieved from a calibration LUT (e.g., as part of the layer one diagnostics). A motor torque integrity test performed by the MTM 200, when the motor is at speed, indicates a fault if an error of the rotor angle exceeds a pre-determined maximum error, and this indirectly secures the rotor position signal.

Following layer one diagnostics of the resolver signal, the MTM 200 secures the resolver signal. For example, the resolver signal may be secured by the following relationship:

$$\sin^2(\theta)+\cos^2(\theta)=1 \qquad (eq. 1).$$

If the relationship shown in equation 1 is false (e.g., indicating an incorrect rotor position (θ), an incorrect look-up table value corresponding to the sine or cosine values of the rotor position (θ), or the like), the MTM 200 transmits a signal indicating a fault alarm. If the relationship shown in equation 1 is true, then the resolver signal is secured.

Although layer one diagnostics may be applied to the motor speed signal, which indicates the angular speed of the electric motor 102, the motor speed signal is indirectly secured by the MTM 200. The MTM 200 may perform a motor speed correlation test during the normal course of operation. The motor speed correlation test includes, among other analytical functions, a comparison of an engine speed and one or more electric motor speeds. For example, in a hybrid vehicle embodiment, the engine speed and the electric motor speeds (e.g., typically two electric motors) should follow a pre-determined relationship (e.g., based on the hybrid operating strategy). The motor speed correlation test indicates a fault if the motor speed is not within a pre-determined operating range, and thus operates, in this capacity, as a rationality test for indirectly securing the motor speed signal.

In addition to the motor speed signal, the $V_{dc}$ signal is indirectly secured by the MTM 200. The $V_{dc}$ signal represents a high voltage, direct current (DC) bus voltage provided to the electric motor 102. Layer one diagnostics may be applied to the $V_{dc}$ signal to determine whether the $V_{dc}$ value exceeds a pre-determined voltage range (e.g., is out-of-range (OOR) high or OOR low), whether a sensor for measuring the DC bus voltage is properly operating, or the like. Additionally, layer one diagnostics can perform a rationality test by correlating the $V_{dc}$ measurements from different locations of a battery pack supplying power to the electric motor 102. The motor torque integrity test performed by the MTM 200 indicates a fault if the DC bus voltage, represented by the $V_{dc}$ signal, is not within a pre-determined range, and thus indirectly secures the $V_{dc}$ signal.

The MTM 200 acquires the torque setpoint signal from the HCP 106 (e.g., as established by the hybrid operating strategy). For example, the MTM 200 reads a torque setpoint from an SPI register and reads a message rolling-counter associated with the torque setpoint. The torque setpoint may be established based on a torque command (e.g., produced in response to a driver input and in accordance with the hybrid operating strategy) to balance system torque (e.g., for vehicle propulsion). The MTM 200 secures the torque setpoint, and thus the torque command, by testing SPI communication between the HCP 106 and the MCP 120. For example, the MTM 200 performs a rolling-count detection to test whether the torque setpoint corresponds with the updated message. If the message rolling-counter is not updating appropriately, the MTM 200 transmits a signal indicating a fault alarm. The checksum determination may also be performed for securing message transmission, and a time-out fault will be declared if the MCP 120 does not timely receive new SPI messages.

Figure 3:
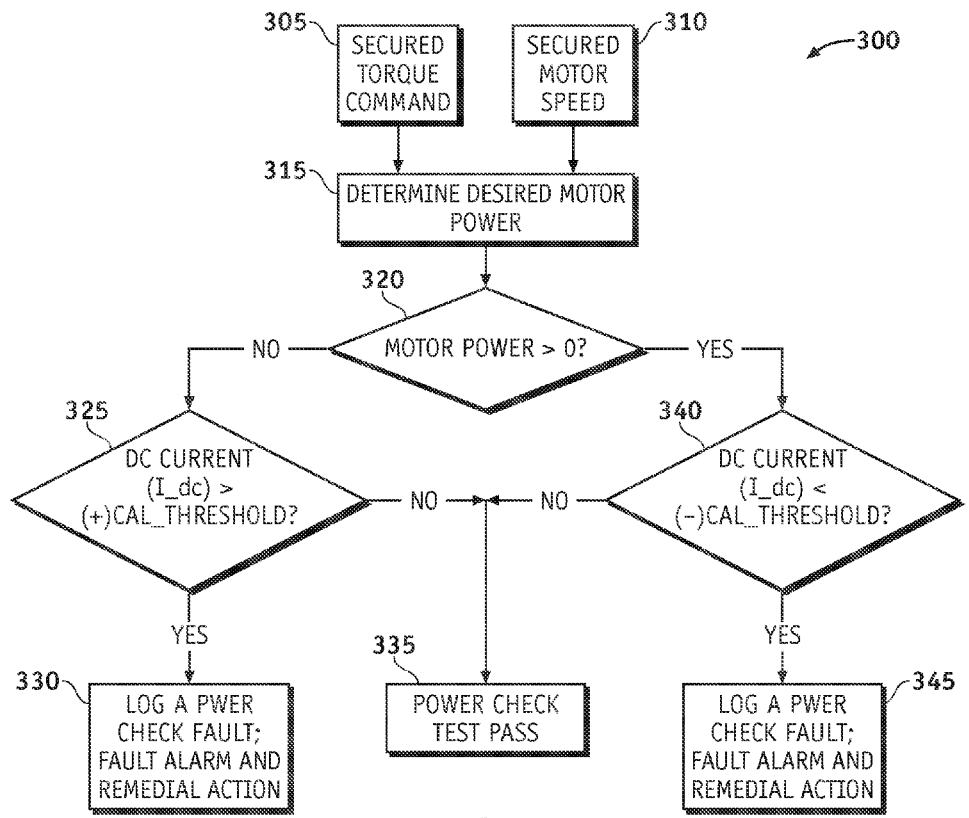
FIG. 3 is a block diagram illustrating a motor power test in accordance with an exemplary embodiment.

FIG. 3 is a block diagram illustrating a motor power test 300. Referring to FIGS. 1-3, the motor power test 300 secures the motor power associated with the particular operating mode (e.g., the motoring mode or the generating mode) of the electric motor 102. A torque command is secured (e.g., by securing the torque setpoint with the MTM 200), as indicated at 305, and the motor speed is secured (e.g., indirectly via the motor torque integrity test), as indicated at 310. A motor power is determined (e.g., via the MTM 200) based on the secured torque command and the secured motor speed, as indicated at 315. The polarity of the motor power, and thus the operating mode of the electric motor 102, is determined, as indicated at 320. For example, the motor power is compared with zero. If the motor power is not greater than zero (e.g., the electric motor is operating in the generating mode), a supply current (e.g., a DC current (I_dc)) to the electric motor 102 is compared with a positive calibration threshold ((+)cal_threshold), as indicated at 325. If the DC current (I_dc) is greater than the positive calibration threshold, the MTM 200 logs a power check fault and may also transmit a signal indicating a fault alarm, as indicated at 330. If the DC current (I_dc) is not greater than the positive calibration threshold, the motor power is secure, as indicated at 335.

If the motor power is greater than zero (e.g., the electric motor is operating in the motoring mode), the DC current (I_dc) is compared with a negative calibration threshold ((−)cal_threshold), as indicated at 340. If the DC current (I_dc) is less than the negative calibration threshold, the MTM 200 logs a power check fault and may also transmit a signal indicating a fault alarm, as indicated at 345. If the DC current (I_dc) is not less than the negative calibration threshold, the motor power is secure, as indicated at 335. In one embodiment, the calibration thresholds compensate for the field-weakening effect at high motor speeds.

Figure 4:
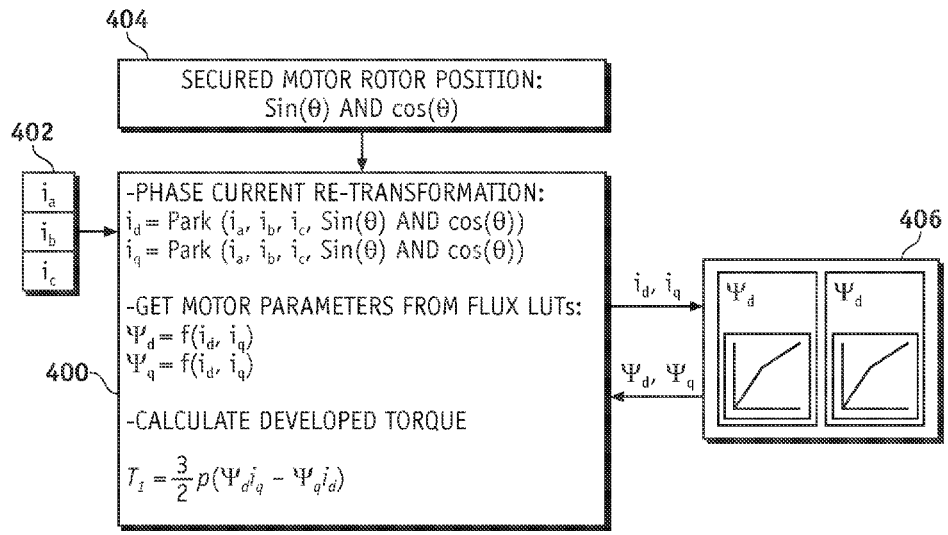
FIG. 4 is a block diagram illustrating a motor torque determination in accordance with an exemplary embodiment.

FIG. 4 is block diagram illustrating a motor torque determination 400 in accordance with an exemplary embodiment. Referring to FIGS. 2 and 4, the calculated motor torque of the electric motor 102 is based on electromagnetic principles, in this embodiment. For example, the MTM 200 calculates a motor torque based on the secured rotor position (e.g., represented by sin(θ) and cos(θ)) and the secured current sensor signals. Phase currents (e.g., $i_a$, $i_b$, and $i_c$ associated with the secured current signals supplied to a three-phase electric motor) 402 and the secured rotor position (e.g., sin(θ) and cos(θ)) 404 are obtained by the MTM 200. The phase currents and secured rotor position may be stored in the memory 202 or in other memory locations. The MTM 200 transforms these phase currents ($i_a$, $i_b$, and $i_c$) to a two-current representation (e.g., a d-axis current ($i_d$) and a q-axis current ($i_q$)) based on the secured rotor position (sin(θ) and cos(θ)). The MTM 200 determines flux linkages (e.g., a d-axis flux linkage ($\psi_d$) and a q-axis flux linkage ($\psi_q$)) based on this two-current representation ($i_d$ and $i_q$). In one embodiment, the MTM 200 retrieves the fluxes ($\psi_d$ and $\psi_q$) from one or more calibration LUTs (e.g., in the memory 202) 406. The motor torque ($T_1$) may then be determined from the following relationship:

$$T_1 = (3/2)p(\psi_d i_q - \psi_q i_d) \qquad \text{(eq. 2)},$$

where p is the number of pole-pairs of the electric motor.

Figure 5:
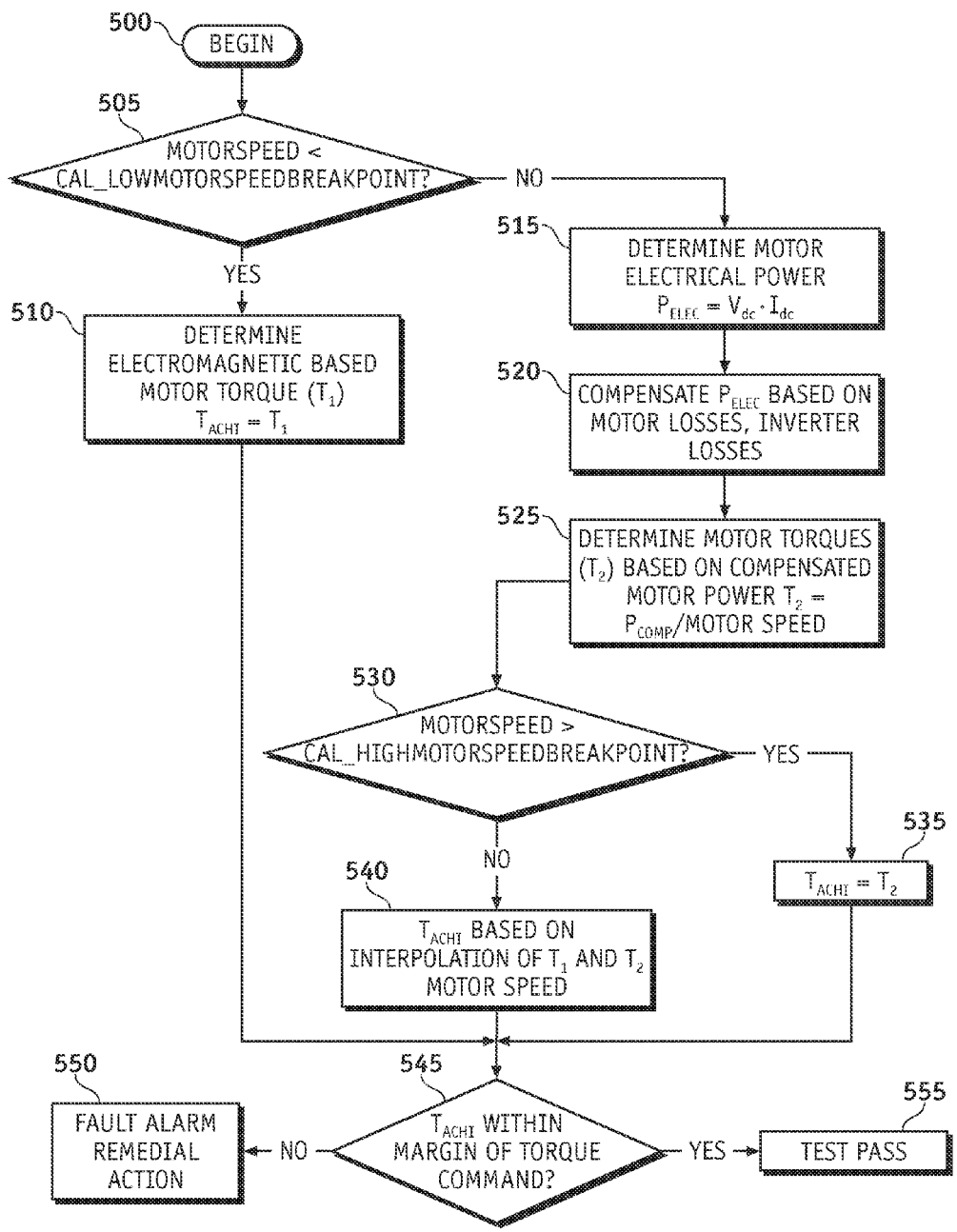
FIG. 5 is a flow diagram of a method for monitoring an achieved motor torque produced by an electric motor in accordance with an exemplary embodiment.

FIG. 5 is a flow diagram of a method 500 for monitoring an achieved motor torque produced by an electric motor in accordance with an exemplary embodiment. The motor speed of the electric motor is compared with a pre-determined threshold, as indicated at step 505. Depending on the motor speed, the achieved motor torque can be determined from either an electromagnetic torque relationship, such as the motor torque determination illustrated in FIG. 4, or an estimated torque based on a balance of power (including compensation for one or more power losses) supplied to the electric motor. Referring to FIGS. 1, 2 and 5, the MTM 200 determines, for example, if the motor speed of the electric motor 102 is less than a calibrated low motor speed threshold (Cal_LowMotorSpeedBreakPoint). This threshold may be selected based on processor tolerances (e.g., based on division by low speed values) of the MTM 200 or the MCP 120.

If the motor speed is less than this threshold, the achieved motor torque ($T_{achi}$) is determined from the electromagnetic torque relationship, as indicated at step 510. For example, if the motor speed of the electric motor 102 is less than the calibrated low motor speed threshold, the achieved motor torque ($T_{achi}$) is determined to be the motor torque ($T_1$) based on the secured rotor position ($\sin(\theta)$ and $\cos(\theta)$) and the secured current sensor signals, which provide the three phase currents ($i_a$, $i_b$, and $i_c$), such as previously discussed in one exemplary embodiment (e.g., the motor torque determination shown in FIG. 4).

If the motor speed is not less than this threshold, the achieved motor torque ($T_{achi}$) is determined from the estimated torque (e.g., based on the power balance and including loss compensation). In one embodiment, the motor electrical power ($P_{elec}$) is determined from a product of the DC bus voltage ($V_{dc}$) and the DC current ($I_{dc}$), as indicated at step 515. One or more losses (e.g., motor losses, inverter losses, or the like) of power are compensated in the motor electrical power ($P_{elec}$), as indicated at step 520. For example, predetermined or estimated power losses associated with one or more sources are added to the motor electrical power ($P_{elec}$) to produce a compensated motor electrical power. A motor torque ($T_2$) is determined from a ratio of the compensated motor electrical power and the motor speed, as indicated at step 525.

The motor speed is compared with another threshold, as indicated at step 530. For example, the MTM 200 determines if the motor speed of the electric motor 102 is greater than a calibrated high motor speed threshold (Cal_HighMotorSpeedBreakPoint). If the motor speed is greater than this threshold, the achieved motor torque is determined to be the motor torque ($T_2$) as indicated at step 535. If the motor speed is not greater than this threshold, the achieved motor torque is determined based on an interpolation of the motor torque ($T_1$) (e.g., based on the secured rotor position ($\sin(\theta)$ and $\cos(\theta)$) and the secured current sensor signals) and the motor torque ($T_2$) (e.g., based on the compensated motor electrical power) and the motor speed, as indicated at step 540.

After determining the achieved motor torque, the achieved motor torque is compared with a torque command or requested torque, as indicated at step 545. For example, the MTM 200 determines if the achieved motor torque ($T_{achi}$) is within a pre-determined margin (e.g., Cal_Threshold*) of the requested torque. A signal is transmitted (e.g., by the MTM 200), indicating a fault alarm, if the achieved torque ($T_{achi}$) is not within the pre-determined margin, as indicated at 550. The achieved motor torque is secure (e.g., Test Pass) if the achieved torque ($T_{achi}$) is within the pre-determined margin of the requested torque, as indicated at 555. The pre-determined margin (Cal_Threshold*) may also be selected to be motor speed dependent.

One or more portions of the method 500 may be embodied in a software program comprising software instructions, instructions sets, executable modules, or the like, and arranged to run on a processor (e.g., the MCP 120 or the like) to monitor a motor torque produced by an electric motor in response to a torque command. The software program when installed and operating on the processor results in the processor performing or executing one or more portions of the software program.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for monitoring an achieved motor torque produced by an electric motor in response to a torque command, the electric motor operable at a motor speed, the method comprising the steps of:
   determining, when the motor speed is not greater than a first pre-determined threshold, the achieved motor torque based on a rotor position of the electric motor and a phase current of the electric motor;
   determining, when the motor speed is greater than the first pre-determined threshold, the achieved motor torque based on a loss-compensated power supplied to the electric motor;
   comparing the achieved motor torque with the torque command; and
   indicating a fault when the achieved motor torque is not within a pre-determined margin of the torque command.

2. A method according to claim 1, wherein the electric motor is operable to receive first, second, and third phase currents; and wherein the step of determining the achieved motor torque when the motor speed is not greater than a first pre-determined threshold comprises:
   converting the first, second, and third phase currents to a d-axis current and a q-axis current based on the rotor position;
   determining a d-axis flux linkage and a q-axis flux linkage based on the d-axis current and the q-axis current; and
   determining the achieved motor torque based on the d-axis flux linkage, the q-axis flux linkage, the d-axis current, and the q-axis current.

3. A method according to claim 2, wherein the step of determining the achieved motor torque ($T_{achi}$) based on the d-axis flux linkage ($\psi_d$), the q-axis flux linkage ($\psi_q$), the d-axis current ($i_d$), and the q-axis current ($i_q$) comprises determining the achieved motor torque ($T_{achi}$) from
   $T_{achi} = (3/2)p(\psi_d i_q - \psi_q i_d)$, wherein p is a number of pole-pairs in the electric motor.

4. A method according to claim 2, further comprising securing the first, second, and third phase currents prior to the step of converting.

5. A method according to claim 1, wherein the step of determining the achieved motor torque when the motor speed is greater than the first pre-determined threshold comprises:
determining a first motor torque based on a motor power of the electric motor; and
estimating the achieved motor torque based on the first motor torque and a comparison of the motor speed with a second pre-determined threshold.

6. A method according to claim 5, wherein the step of estimating comprises:
determining a second motor torque based on the rotor position of the electric motor and the phase current of the electric motor; and
interpolating the second motor torque and the first motor torque to determine the achieved motor torque when the motor speed is not greater than the second pre-determined threshold, wherein the achieved motor torque is the first motor torque when the motor speed is greater than the second pre-determined threshold.

7. A method according to claim 5, wherein the electric motor is coupled to a high voltage (HV) direct current (DC) bus voltage and configured to receive a DC supply current based on the HV DC bus voltage; and wherein the step of determining a first motor torque based on a motor power comprises:
determining an electrical power from a product of the HV DC bus voltage and the DC supply current;
compensating the electrical power for at least one of a motor loss and an inverter loss to produce the loss-compensated power; and
dividing the loss-compensated power by the motor speed to produce the first motor torque.

8. A method according to claim 7, further comprising, prior to the step of compensating, securing the electrical power.

9. A method according to claim 1, further comprising, prior to the step of determining the achieved motor torque when the motor speed is not greater than a first pre-determined threshold, securing the rotor position of the electric motor prior to the step of determining the achieved motor torque.

10. A method according to claim 1, further comprising, prior to the step of comparing, securing the torque command.

11. A controller for monitoring an achieved motor torque produced by an electric motor in response to a torque command, the electric motor operable at a motor speed, the controller comprising:
an input operable to receive the motor speed, the torque command, a rotor position of the electric motor, and a phase current of the electric motor;
an output operable to provide a signal indicating a fault; and
a processor coupled to the input and the output, the processor configured to:
determine, when the motor speed is not greater than a first pre-determined threshold, the achieved motor torque based on the rotor position of the electric motor and the phase current of the electric motor;
determine, when the motor speed is greater than the first pre-determined threshold, the achieved motor torque based on a loss-compensated power supplied to the electric motor; and
produce the signal when the achieved motor torque is not within a pre-determined margin of the torque command.

12. A controller according to claim 11, wherein the electric motor is operable to receive first, second, and third phase currents; wherein the processor is further configured to:
convert the first, second, and third phase currents to a d-axis current and a q-axis current based on the rotor position;
determine a d-axis flux linkage and a q-axis flux linkage based on the d-axis current and the q-axis current; and
determine the achieved motor torque based on the d-axis flux linkage, the q-axis flux linkage, the d-axis current, and the q-axis current.

13. A controller according to claim 12, further comprising a memory coupled to the processor, the memory configured to store at least one look-up table; and wherein the processor is further configured to determined the d-axis flux linkage and the q-axis flux linkage from the at least one look-up table.

14. A controller according to claim 11, wherein the processor is further configured to determine, when the motor speed is not greater than a first pre-determined threshold, the achieved motor torque ($T_{achi}$) based on the d-axis flux linkage ($\psi_d$), the q-axis flux linkage ($\psi_q$), the d-axis current ($i_d$), and the q-axis current ($i_q$) comprises determining the achieved motor torque ($T_{achi}$) from
$T_{achi}=(3/2)p(\psi_d i_q - \psi_q i_d)$ wherein p is a number of pole-pairs in the electric motor.

15. A controller according to claim 11, wherein the processor is further configured to:
determine, when the motor speed is greater than the first pre-determined threshold, a first motor torque based on a motor power of the electric motor; and
estimate the achieved motor torque based on the first motor torque and a comparison of the motor speed with a second pre-determined threshold.

16. A controller according to claim 15, wherein the processor is further configured to:
determine a second motor torque based on the rotor position of the electric motor and the phase current of the electric motor; and
interpolate the second motor torque and the first motor torque to determine the achieved motor torque when the motor speed is not greater than the second pre-determined threshold, wherein the achieved motor torque is the first motor torque when the motor speed is greater than the second pre-determined threshold.

17. A controller according to claim 11, wherein the electric motor is coupled to a high voltage (HV) direct current (DC) bus voltage and configured to receive a DC supply current based on the HV DC bus voltage; and wherein the processor is further configured to:
determine an electrical power from a product of the HV DC bus voltage and the DC supply current;
compensate the electrical power for at least one of a motor loss and an inverter loss to produce the loss-compensated power; and
divide the loss-compensated power by the motor speed to produce the first motor torque.

* * * * *